(12) United States Patent
Simmons et al.

(10) Patent No.: US 12,419,222 B2
(45) Date of Patent: Sep. 23, 2025

(54) WRAP DETECTION AND MOISTURE SENSING CONTROL SYSTEM OF AGRICULTURAL BALER

(71) Applicant: CNH Industrial America LLC, New Holland, PA (US)

(72) Inventors: Scott C. Simmons, Lititz, PA (US); Kevin M. Smith, Narvon, PA (US); Derek Hart, Mountville, PA (US)

(73) Assignee: CNH Industrial America LLC, New Holland, PA (US)

( * ) Notice: Subject to any disclaimer, the term of this patent is extended or adjusted under 35 U.S.C. 154(b) by 886 days.

(21) Appl. No.: 17/457,828

(22) Filed: Dec. 6, 2021

(65) Prior Publication Data

US 2023/0175996 A1  Jun. 8, 2023

(51) Int. Cl.
*A01F 15/07* (2006.01)
*G01N 27/04* (2006.01)

(52) U.S. Cl.
CPC .......... *A01F 15/071* (2013.01); *G01N 27/048* (2013.01)

(58) Field of Classification Search
CPC .... A01F 15/071; A01F 15/715; G01N 27/048
See application file for complete search history.

(56) References Cited

U.S. PATENT DOCUMENTS

| | | | |
|---|---|---|---|
| 2,826,051 A * | 3/1958 | Halberg | F16D 3/41 464/130 |
| 6,377,058 B1 | 4/2002 | Pemrick | |
| 7,114,376 B2 | 10/2006 | Louks et al. | |
| 7,231,814 B2 * | 6/2007 | Platon | A01F 15/08 460/7 |
| 7,415,924 B2 | 8/2008 | Roberts | |
| 7,743,699 B1 | 6/2010 | Freeman et al. | |
| 8,596,194 B2 * | 12/2013 | Kraus | A01F 15/0816 100/2 |
| 2004/0182043 A1 * | 9/2004 | Viaud | A01F 15/0715 53/118 |

FOREIGN PATENT DOCUMENTS

| | | | |
|---|---|---|---|
| EP | 1461995 A2 | 9/2004 | |
| EP | 3666670 A1 | 6/2020 | |
| EP | 3760032 A1 * | 1/2021 | ......... A01F 15/0833 |
| EP | 3760032 B1 | 6/2021 | |
| FR | 2 806 251 | 9/2001 | |

OTHER PUBLICATIONS

Extended European Search Report and Written Opinion for EP Application No. 22211446.4 dated Apr. 17, 2023 (eight pages).

* cited by examiner

*Primary Examiner* — Joseph M Rocca
*Assistant Examiner* — Ashley A Kaercher
(74) *Attorney, Agent, or Firm* — Fletcher Yoder, P.C.

(57) ABSTRACT

An agricultural baler includes: a frame; a bale chamber coupled with the frame; and a control system including: at least one sensor coupled with the frame, positioned circumferentially relative to the bale chamber, and configured for sensing an operative parameter of a crop material in the bale chamber.

9 Claims, 6 Drawing Sheets

WRAP DETECTION AND MOISTURE SENSING CONTROL SYSTEM OF AGRICULTURAL BALER

FIELD OF THE INVENTION

The present invention pertains to an agricultural machine, and, more specifically, to an agricultural baler.

BACKGROUND OF THE INVENTION

Agricultural harvesting machines, such as agricultural balers (which can be referred to balers), have been used to consolidate and package crop material (which, depending upon the application, can also be referred to as forage, forage material, or forage crop material) so as to facilitate the storage and handling of the crop material for later use. Often, a mower-conditioner cuts and conditions the crop material for swath or windrow drying in the sun. When the cut crop material is properly dried (depending upon the application), an agricultural harvesting machine, such as an agricultural baler, which can be a round baler, travels along the swath or windrows (hereinafter, collectively referred to as windrows, unless otherwise specified) to pick up the crop material. In the case of round balers, the crop material is formed into cylindrically-shaped round bales.

More specifically, pickups of the baler gather the cut and windrowed crop material from the ground, and then convey the cut crop material into a bale-forming chamber within the baler. A drive mechanism operates to activate any pickups, augers, and/or a rotor of a feed mechanism. A conventional baling chamber may include a pair of opposing sidewalls with a series of rolls (which can be referred to as rollers) and belts that rotate and compress the crop material into a cylindrical shape.

When the bale has reached a desired size and density, a wrapping assembly, which includes wrap material, may wrap the bale to ensure, at least in part, that the bale maintains its shape and density. The wrap material can include a film (such as a flexible plastic wrap) or a net (which can be referred to as net wrap). For example, wrap material may be used to wrap the bale of crop material. A cutting or severing mechanism (which can be referred to as a knife) of the wrapping assembly may be used to cut the wrap material once the bale has been wrapped. The wrapped bale may be ejected from the baler and onto the ground by, for example, raising a tailgate of the baler. The tailgate is then closed, and the cycle repeated as necessary and desired to manage the field of cut crop material. To wrap the bale, the wrapping assembly, for example, executes a wrapping cycle during which an actuator powers a rotating arm, also referred to as a duckbill, to move from a home position to an insert position to guide the film or net wrap around the bale, and then to retract the duckbill from the insert position back to the home position once the bale is wrapped.

Nevertheless, sometimes the wrap material (such as the film, as well as occasionally the net wrap) does not properly wrap the bale of crop material. Instead, the wrap material goes around one or more rollers of the baler. Such faulty wrapping may not be detected, and the bale may be ejected without wrapping material on the bale.

Further, it is known to use sensors on a side wall of a round baler in order to detect the moisture content of the bale in the baler. These sensors are used to measure the conductivity of the crop material of the bale to detect the moisture content. These sensors, however, measure the moisture content of only the lateral ends of the bale, near the side walls, which often underestimates the moisture content of the crop material and thus results in inaccuracies.

What is needed in the art is a simple and efficient way to detect when the wrap material has not properly wrapped around the bale prior to ejecting the bale from the baler and also to detect the moisture content of a bale in the baler with improved accuracy.

SUMMARY OF THE INVENTION

The present invention provides an agricultural baler with a control system for determining when the wrapping material has not properly wrapped around the bale prior to ejecting the bale from the baler, and for determining a moisture content of a bale while in the bale chamber of the baler.

The invention in one form is directed to a control system of an agricultural baler, the agricultural baler including a frame, a bale chamber coupled with the frame, and a wrapping assembly coupled with the frame and configured for wrapping a wrap material about the crop material in the bale chamber during a wrap cycle, the control system including: at least one sensor coupled with the frame, positioned circumferentially relative to the bale chamber, and configured for sensing an operative parameter of a crop material in the bale chamber.

The invention in another form is directed to an agricultural baler, including: a frame; a bale chamber coupled with the frame; and a control system including: at least one sensor coupled with the frame, positioned circumferentially relative to the bale chamber, and configured for sensing an operative parameter of a crop material in the bale chamber.

The invention in yet another form is directed to a method of using an agricultural baler, the method including the steps of: providing an agricultural baler that includes a frame, a bale chamber coupled with the frame, and a control system including at least one sensor coupled with the frame and positioned circumferentially relative to the bale chamber; and sensing, by the at least one sensor, an operative parameter of a crop material in the bale chamber.

An advantage of the present invention is that it provides a way to ascertain when a bale has not been wrapped properly with the wrapping material, before the bale is ejected from the bale chamber.

Another advantage is that it provides at least one circumferential sensor that is directed directly at the bale of crop material in the bale chamber, so as to detect an operative parameter associated directly with the crop material, the operative parameter being an electrical property of the bale of crop material.

Yet another advantage is that it provides that the at least one circumferential sensor can be used for not only detecting when the bale has not been wrapped properly with the wrap material, but can also be used for detecting a moisture content of the bale while in the bale chamber. Stated another way, a round bale control system is provided which uses an electrical property, such as electrical conductivity (generally speaking), to determine moisture content of the bale during the baling process and to determine whether wrap material is on the bale, either during or after a wrap cycle, while the bale is still in the baler.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle, agricultural baler, and/or components thereof are usually determined with reference to the direction of forward operative travel of the agricultural vehicle and/or agricultural baler, but they should not be construed as limiting. The terms "longitudinal" and "transverse" are determined with reference to the fore-and-aft direction of the agricultural vehicle and/or agricultural baler and are equally not to be construed as limiting. The terms "downstream" and "upstream" are determined with reference to the intended direction of crop material flow during operation, with "downstream" being analogous to "rearward" and "upstream" being analogous to "forward."

Figure 1:
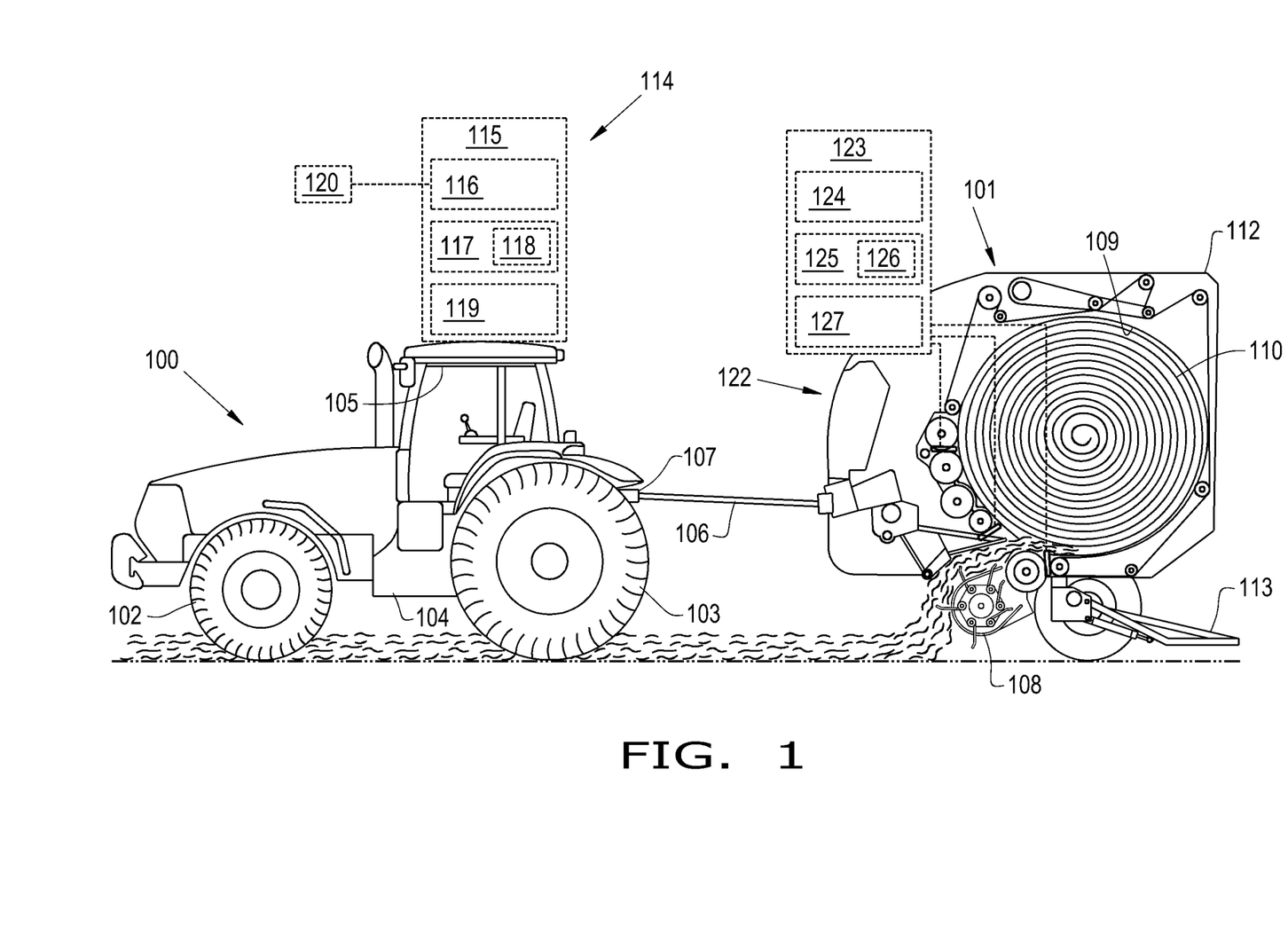
FIG. 1 illustrates a side view of an exemplary embodiment of an agricultural vehicle, formed as a tractor, and an agricultural baler, in side cutaway view showing internal workings of the agricultural baler, in accordance with an exemplary embodiment of the present invention.

Referring now to the drawings, and more particularly to FIG. 1, there is shown an embodiment of an agricultural vehicle 100 (which can be referred to as a work vehicle 100) towing an agricultural baler 101, in accordance with the present invention, to perform a baling operation within a field. As shown, work vehicle 100 can be configured as an agricultural tractor, such as an operator-driven tractor or an autonomous tractor. However, in some embodiments, the work vehicle 100 may correspond to any other suitable vehicle configured to tow a baler across a field or that is otherwise configured to facilitate the performance of a baling operation, including an autonomous baling vehicle. Additionally, as shown, baler 101 can configured as a round baler configured to generate round bales. However, in some embodiments, baler 101 may have any other suitable configuration, including being configured to generate square or rectangular bales. It should be further appreciated that baler 101, while shown as being towed by tractor 100, may also be a self-propelled baler that does not rely on a separate vehicle for propulsion and/or power to function.

Work vehicle 100 includes a pair of front wheels 102, a pair of rear wheels 103, and a chassis 104 coupled to and supported by the wheels 102, 103. An operator's cab 105 may be supported by a portion of the chassis 104 and may house various input devices for permitting an operator to control the operation of work vehicle 100 and/or baler 101. Additionally, work vehicle 100 may include an engine and a transmission mounted on chassis 104. The transmission may be operably coupled to the engine and may provide variably adjusted gear ratios for transferring engine power to wheels 103 via a drive axle assembly.

As shown in FIG. 1, work vehicle 100 may be coupled to baler 101 via a tongue 106 mounted on a hitch 107 of work vehicle 100 to allow vehicle 100 to tow baler 101 across the field. As such, work vehicle 100 may, for example, guide baler 101 toward crop material deposited in windrows on the field. As is generally understood, to collect the crop material, baler 101 includes a crop collector 108 mounted on a front end of baler 101. Crop collector 101 may, for example, have a rotating wheel with tines that collect crop material from the ground and direct the crop material toward a bale chamber 109 of baler 101. Inside bale chamber 109, rollers, belts, and/or other devices compact the crop material to form a generally cylindrically-shaped bale 110. Bale 110 is contained within baler 101 until ejection of bale 110 is instructed (e.g., by the operator and/or a baler controller 123 of baler 101). In some embodiments, bale 110 may be automatically ejected from baler 101 once bale 110 is formed by baler controller 123 detecting that bale 110 is fully formed and outputting an appropriate ejection signal. Further, work vehicle 100 includes a control system 114, which includes a controller 115, which includes a processor 116, memory 117, data 118, and instructions 119. Control system 114 can further include an input/output device 120 such as a laptop computer (with keyboard and display) or a touchpad (including keypad functionality and a display), device 120 being configured for a user to interface therewith.

As shown in FIG. 1, baler 101 may also include a tailgate 112 movable between a closed position (as shown in the illustrated embodiment) and an opened position via a suitable actuator assembly. Tailgate 112 and/or the actuator assembly may be controlled to open and close by baler controller 123. In the closed position, tailgate 112 may confine or retain bale 110 within baler 101. In the open position, tailgate 112 may rotate out of the way to allow bale 110 to be ejected from the bale chamber 109. Additionally, as shown in FIG. 1, baler 101 may include a ramp 113 extending from its aft end that is configured to receive and direct bale 110 away from baler 113 as it is being ejected from bale chamber 109. In some embodiments, ramp 113 may be spring loaded, such that ramp 113 is urged into a raised position, as illustrated. In such embodiments, the weight of bale 110 on ramp 113 may drive ramp 113 to a lowered position in which ramp 113 directs bale 110 to the soil surface. Once bale 110 is ejected, bale 110 may roll down ramp 113 and be deposited onto the field. As such, ramp 113 may enable bale 110 to maintain its shape and desired density by gently guiding bale 110 onto the field. Further, baler 101 includes a control system 122, which includes controller 123, which includes a processor 124, memory 125, data 126, and instructions 127. Controller 123 can communicate with controller 115, so that controller 115 outputs information to the display of input/output device 120 of work vehicle 100, thereby informing a user of various conditions of baler 101 and bales 110 forming therein.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of baler 101 described above and shown in FIG. 1 is provided only as one example. Thus, it should be appreciated that the present disclosure may be readily adaptable to any manner of baler configuration. For example, as indicated previously, baler 101 may, in some embodiments, correspond to a square baler configured to generate square or rectangular bales.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Baler controller 123, herein, is assumed to be the primary controller for controlling operations of baler 101. However, controller 123, as indicated in FIG. 1, can be in communication with controller 115 of work vehicle 100, such that any or all information associated with either controller 115, 123 can be shared with the other controller 115, 123, and either controller 115, 123 can perform the functions of the other controller 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Further, while not shown, both controllers 115, 123 can communicate with a remotely located data center, which controllers 115, 123 can communicate with by any suitable way, such as those just referenced. Such a data center can be configured to perform any of the functions associated with controllers 115, 123. Controllers 115, 123 and the data center can be a part of any network facilitating such communication therebetween, such as a local area network, a metropolitan area network, a wide area network, a neural network, whether wired or wireless.

Figure 2:
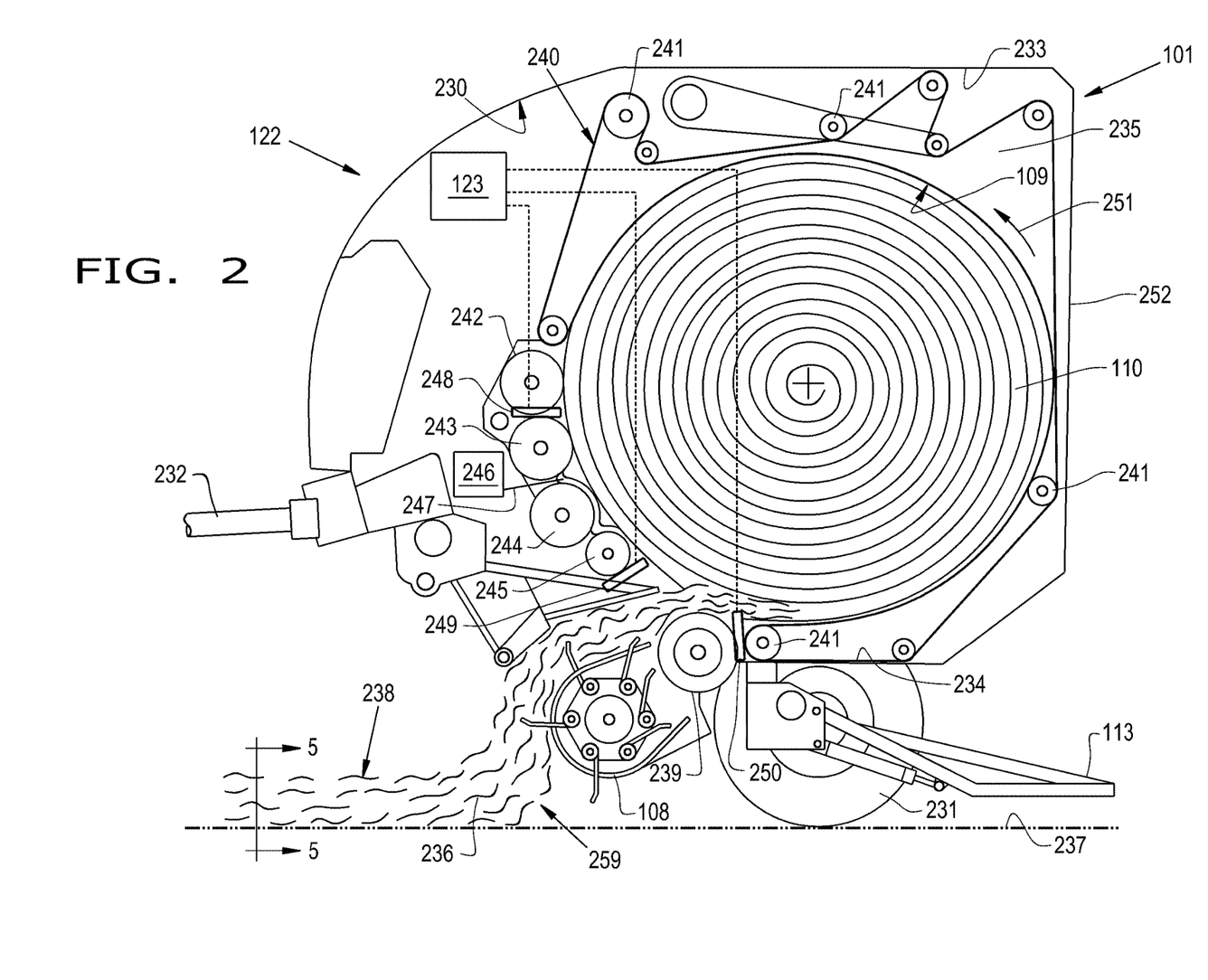
FIG. 2 illustrates a side cutaway view of the internal workings of the agricultural baler of FIG. 1, the agricultural baler including a control system, in accordance with an exemplary embodiment of the present invention.

Referring now to FIG. 2, in FIG. 2 there is shown a side view of agricultural baler 101, with portions broken away. Baler 101 includes frame 230, wheels 231 (though not shown, gauge wheels can also be provided on baler 101, as is known), power take-off 232, ramp 113 (discussed above), top wall 233 of baler 101, bottom wall 234 of baler 101, rear wall 252 of baler 101, side walls 235 of baler 101, bale chamber 109, bale 110 (essentially fully formed in FIG. 2), crop collector 108, crop material 236, rotary mechanism 239, belt 240, belt rollers 241, rollers 242, 243, 244, 245, wrapping assembly 246, wrap material 247, control system 122, sensors 248, 249, 250, and controller 123. Frame 230 provides an overall foundational structure for baler 101 and can be made from any suitable material, such as steel. One wheel 231 is shown supporting frame 230 on a ground of a field 237. Power take-off 232 receives mechanical power from tractor 100 and transmits that mechanical power to various components of baler 101. Top wall 233, bottom wall 234, and side walls 235 are coupled with frame 230 and can be formed, for example, of sheet metal, such as steel, or any suitable material. Side walls 235 are lateral walls of baler 101 and thus positioned such that ends of bale 110 are adjacent to side walls 235 when formed in bale chamber 109. Top wall 233, bottom wall 234, rear wall 252 (which can form part of tailgate 112), and side walls, 235, in part, form an enclosure which is bale chamber 109, which houses bale 110 therein until bale 110 is ejected from baler 101. Bale chamber 109 is coupled with frame 230. Bale chamber 109 is, in a relatively narrow sense, is defined and thus formed, at least in part, circumferentially by belt 240 and rollers 241, 242, 243, 244, 245, and laterally by side walls 235; bale chamber 109 is thus a bale-forming area within an interior of baler 101 and is variable in size (growing, for instance, as bale 110 grows). Crop collector 108 is shown in FIG. 2 as being a rotary element with a plurality of tines that rotate about a transversely extending axis of rotation in a clockwise direction (according to the view of FIG. 2). As the tines rotate, they pick up the crop material 236, so that crop material 236 progresses from a ground of a field 237 onward to bale chamber 109. Crop material 236 can be any crop material suitable for being formed into bales, such as any mentioned above. Such crop material 236 can be, for example, forage which is used for animal feed. Crop material 236 is shown in FIG. 2 as being disposed in a swath or windrow 238 while on the ground of field 237, with the wetter portion of windrow 238 being disposed on the underside 259 of windrow 238. Rotary mechanism 239 is also configured to move crop material onward into bale chamber 109 and can rotate clockwise (according to the view of FIG. 2) about a transversely extending axis of rotation. Belt 240 can be endless and winds in serpentine manner around a series of belt rollers 241. Belt 240 serves to compress crop material 236 in bale chamber 109 and thereby to form at least a partial angular boundary for bale 110 forming in bale chamber 109 (shown extending from about the 9 o'clock to the 6 o'clock positions in FIG. 2). Belt rollers 241 (only a few of which are labeled in FIG. 2) serve to tension belt 240. Rollers 242, 243, 244, 245 also form a partial angular boundary for bale 110 (and thus compress bale 110 at least in a latter forming stage of bale 110), each rotating in a clockwise direction about a transversely extending axis of rotation.

Wrapping assembly 246 is shown schematically in FIG. 2. Wrapping assembly 246 is coupled with frame 230 and is configured for wrapping wrap material 247 about crop material 236 in bale chamber 109 during a wrap cycle. Wrapping assembly includes a storage roller, a knife, and wrap material 247. The storage roller includes a stock of yet unused wrap material 247 (unused in the sense that wrap material 247 is still on the roller and not yet wrapped around bale 110), wrap material 247 shown in FIG. 2 as extending from the storage roller to bale 110 so as to be wrapped around a circumference of bale 110. The knife (which can also be referred to as a cutting mechanism) is for cutting wrap material 247 after wrap material 247 has sufficiently wrapped about the circumference of bale 110 (which can be one time, one-and-a-half times, two, three, four, five, or six times, for example, depending upon the needs of an end user of bale 110). Wrap material 247 can be a plastic film or netting material (which can be referred to as net wrap, as indicated above). Wrap material 247 extends between rollers 243, 244 prior to wrapping around bale 110; rollers 243, 244 can form a nip through which wrap material 247 extends, and one of rollers 243, 244 can be a drive roller configured to pull on wrap material 247 so as to unwind wrap material 247 from its storage roll. Wrap material 247 occasionally fails to wrap around bale 110 but instead wraps around baler hardware such as rollers 244, 245 (as indicated by excess material around these rollers in FIG. 2). A wrap cycle pertains to the period and events associated with the wrapping of wrap material 247 about bale 110 in bale chamber. The wrap cycle can begin with the dispensing of wrap material 247 from its storage roller to bale 110 (or when bale begins to pull wrap material 247 off of the storage roll) and end with the cutting of wrap material 247 now wrapped around bale 110 (or, undesirably, other structure of baler 101) from the wrap material 247 that is still connected to the storage roller, as is known in the art.

Figure 3:
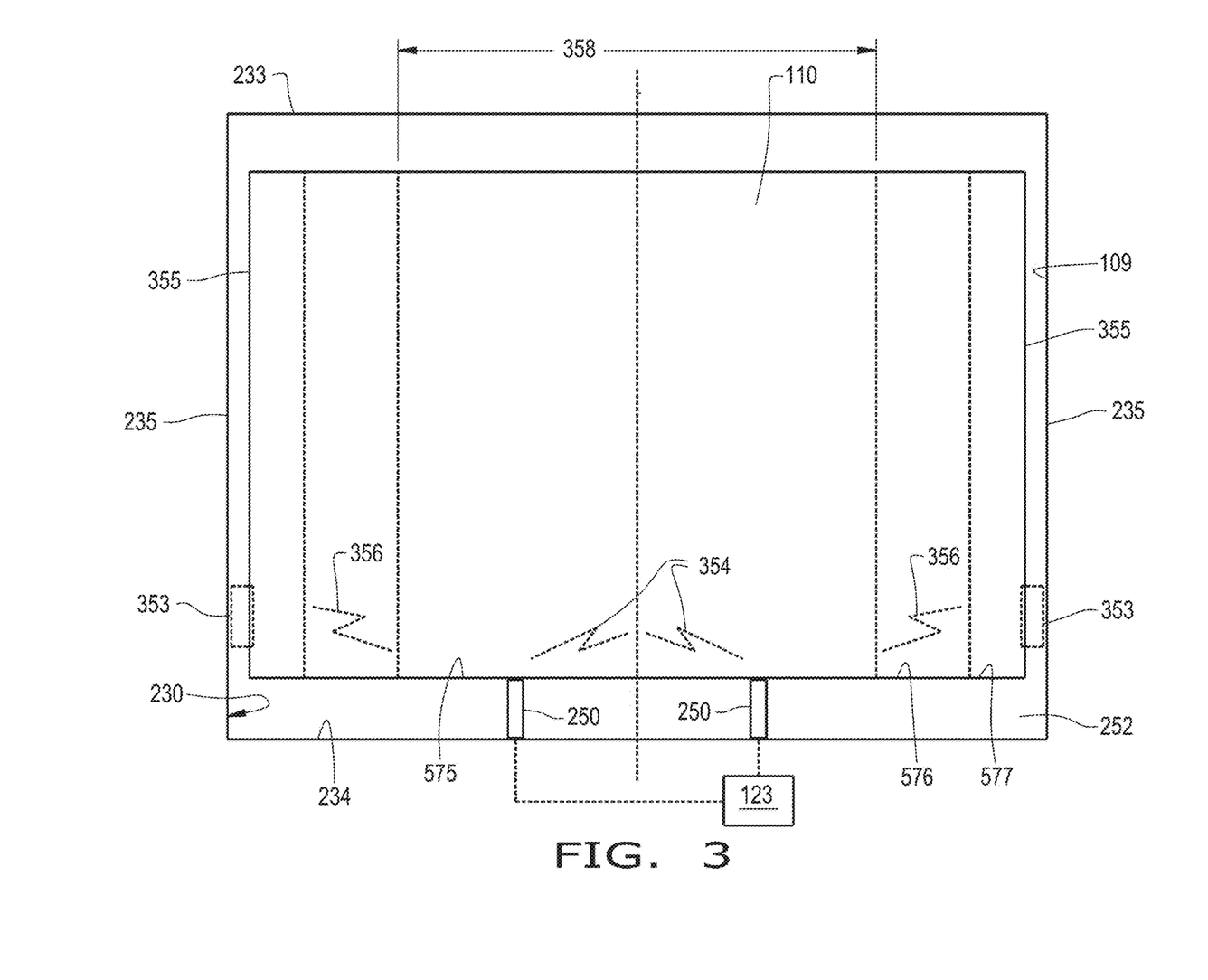
FIG. 3 illustrates a schematic front view of the agricultural baler of FIG. 2 including the control system, with portions broken away, in accordance with an exemplary embodiment of the present invention.

Control system 122 includes sensors 248, 249, 250, and controller 123. Sensors 248, 249, 250 can be positioned in any suitable location for their purposes and are coupled with frame 230, FIG. 2 showing exemplary positioning of sensors 248, 249, 250, in accordance with an embodiment of the present invention. Sensor 248 is positioned between rollers 242 and 243. Sensor 249 is positioned to a downstream side of roller 245 (downstream in a sense of a direction of rotation 251 of bale 110). Sensor 250 is positioned to a downstream side of rotary mechanism 239. Sensors 248, 249, 250 are position circumferentially relative to bale chamber 109, and circumferentially facing bale 110 when bale 110 is in bale chamber 190, as is visible in FIG. 2. More specifically, sensors 248, 249, 250 are positioned circumferentially relative to a forming and/or formed bale 110, and are thus positioned in a partial circle and thus angularly disposed to one another. Though three sensors 248, 249, 250 are shown in FIG. 2, it can be appreciated that this number is exemplary, and that more or less than three such sensors can be employed, in accordance with the present invention. Further, sensors 248, 249, 250 can be formed as pads or plates, though any suitable configuration of sensors 248, 249, 250 is within the scope of the present invention. Further, the side view of FIG. 2 shows only one of sensors 248, 249, 250. Instead, in accordance with an embodiment of the present invention, each of sensors 248, 249, 250 can be one of a pair of corresponding sensors 248, 249, 250, such that each sensor can be one of a pair of sensors 248, a pair of sensors 249, and a pair of sensors 250. The other sensor of the pair can be spaced apart transversely and substantially along a same vertical plane as the sensor 248, 249, 250 shown in FIG. 2, and thus deeper into the view of FIG. 2 and thus not visible in FIG. 2. FIG. 3, however, shows this arrangement of pairs of sensors 248, 249, 250 more clearly, as discussed below. The pair of sensors 248, 249, 250 can be placed in relatively close proximity to one another, or far apart. In accordance with an embodiment of the present invention, sensors 248, 249, 250 can be formed as electrodes (which can also be referred to as probes). Each sensor is configured for emitting and/or receiving an electrical current, which can be direct current (DC) or alternating current (AC), the electrical current being supplied by a power supply or generator (not shown) of work vehicle 100 and/or baler 101. For instance, one sensor 250 emits the electrical current, and the other sensor 250 of the pair receives the electrical current 250, with the result that sensors 250 are configured for transmitting an electrical current between each other. In so doing, a voltage difference (drop) can be detected between each other, depending upon the level of resistance between sensors 250. In this way, an electrical conductivity (generally speaking) between the pairs of sensors 250 can be determined. Further, if alternating current is passed between sensors 250, then the value of interest is a peak voltage difference between sensors 250. Further, as shown in FIG. 2, each of sensor 248, 249, 250 submits data signals corresponding to what they have sensed to controller 123. Controller 123, which is operatively coupled with sensors 248, 249, 250, receives the data signals from sensors 248, 249, 250 and determines whether wrap material 247 has wrapped around bale 110 or not.

Referring now to FIG. 3, there is shown a schematic front view of agricultural baler 101, with portions broken away, focusing primarily on bale 110 and sensors 250. Though only sensors 250 are shown in FIG. 3 (and FIG. 4), sensors 250 are presented as representative of sensors 248 and 249 as well; the respective arrangement and functionality of sensors 248 and 249 can be substantially similar to what is described with respect to sensors 250 (though at a different place relative to bale chamber 109). Bale 110 is essentially fully formed in bale chamber 109. Baler 101 is shown to include side walls 235, bottom wall 234, rear wall 252, top wall 233, bale chamber 109, and frame 230. Though sensors 250 are shown as being supported by bottom wall 234 which can be coupled with or a part of frame 230, sensors 250 can alternatively be supported by an intermediate structure which is directly or indirectly coupled with frame 230, such that sensors 250 are coupled with frame 230. Sensors 250 are shown as a pair transversely spaced apart from another along bottom wall 234. Sensors 250 are configured to transmit and/or receive an electrical current 254 therebetween, which can pass through bale 110 depending upon the circumstances. Sensors 250 can be spaced apart enough so that they are closer to one another than the nearest electrically conductive structure, so that the electrical current flows between sensors 250, rather than to other electrically conductive structures of baler 101. Alternatively, sensors 250 can be spaced farther apart, and/or can pass electrical current to one another by way of other electrically conductive structure of baler 101, such as frame 230.

Thus, sensors 248, 249, 250 are configured for sensing an operative parameter of crop material 236 in bale chamber 109. The operative parameter can be associated with an electrical property of bale 110 of crop material 236, such as resistance, electrical conductivity (a), and/or electrical current, crop material 236 and/or wrap material 247 being at times between respective pairs of sensors 248, 249, 250. Thus, sensors 248, 249, 250 are physically positioned so that they are directed directly at bale 110 and thus can emit electrical current that can encounter bale 110, depending upon whether bale 110 is wrapped or not. By this physical positioning, sensors 248, 249, 250 are not directed at hardware of baler 101, such as rollers 242, 243, 244, 245. Further, sensors 248, 249, 250 include a conductive material which can contact an outer surface of crop material 236 forming bale 110 or a surface of wrap material 247 wrapped around bale 110, while being electrically isolated from any conductive material, such as any metallic surfaces on baler 101. The electrical property can thus be measured between respective sensor pairs 248, 249, 250. Further, sensors 248, 249, 250 are further configured for outputting, to controller 123, an operative parameter signal corresponding to the operative parameter, as indicated by the dashed lines between sensors 248, 249, 250 and controller 123 in FIGS. 2, 3. More specifically, controller 123 is configured for: (a) receiving the operative parameter signal which sensors 248, 249, 250 have outputted; and (b) determining a wrap material condition relative to crop material 236 based at least in part on the operative parameter signal. Regarding (b), the wrap material condition refers to whether or not bale 110 is wrapped with wrap material 247; stated another way, the wrap material condition refers to the presence or absence of wrap material 247 on bale 110, as detected by sensor 248, 249, 250 which are directed at bale 110. Further, as indicated in FIG. 1, controller 123 is configured for outputting its determination, for example, to a display screen of input/output device 120, so as to inform and thereby alert a user, who can then prevent bale 110 from being ejected from bale chamber 109. Alternatively, the output of controller 123 can include a signal that can automatically cause baler 101 not to eject bale 110 from baler 101.

Figure 4:
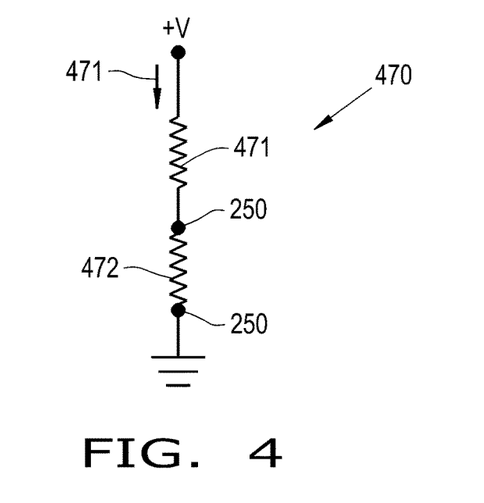
FIG. 4 illustrates a circuit diagram of the control system, with portions broken away, in accordance with an exemplary embodiment of the present invention.

Referring now to FIG. 4, there is shown a circuit diagram 470, according to one embodiment of the present invention. It can be readily appreciated that circuit diagram 470 is but one way of designing an electrical circuit within the scope of the present invention, and is provided as a conceptual model. Circuit diagram assists in explaining how controller 123 can determine a presence of wrap material 247 on bale 110 by way of electrical resistance, electrical current, and/or electrical conductivity. Shown are a voltage supply (indicated by +V, whether AC or DC), resistors 471, 472 (disposed in series), and ground (assumed to be 0 V). Sensors 250 (electrodes 250) are at upstream and downstream nodes of resistor 472. Using a conventional understanding of the flow of electrical current, electrical current flows in the direction of flow direction arrow 471. What is shown can be considered a voltage divider.

With respect to calculating resistance, the amount of the supply voltage is known, as is the value of resistor 471. Further, the voltage across resistor 472 is provided as a measured value to controller 123, using sensors 250, by passing (or attempting to pass) electrical current 354 between the pair of sensors 250. Using these known values, controller 123 can calculate the value of the resistance of resistor 472. To do so, it is understood that: (a) the total supply voltage is equal to the voltage drop across resistor 471 plus the voltage drop across resistor 472, such that $V_{471}=V_T-V_{472}$, wherein $V_{471}$ is the voltage drop across resistor 471, $V_T$ is the total supply voltage, and $V_{472}$ is the voltage drop across resistor 472; and (b) the current across resistor 471 is equal to the current across resistor 472, such that $V_{471}/R_{471}=V_{472}/R_{472}$, wherein $R_{471}$ is the resistance of resistor 471, and $R_{472}$ is the resistance of resistor 472. In light of the equations of (a) and (b), the resistance of resistor 472 can be found as follows: $R_{472}=(V_{472}*R_{471})/V_{471}$. Upon calculating the value of $R_{472}$, controller 123 can use this value to determine whether bale 110 is wrapped. To do so, controller 123 can, for example, compare $R_{472}$ with values in a look-up table and/or a predetermined threshold value. Further, controller 123 can be configured to ascertain that an open circuit is present between sensors 250, for instance, if $R_{472}$ is above a very high threshold, or what might be deemed a null value is returned for $R_{472}$, because no value could be calculated for $R_{472}$, because of the lack of flow of electrical current. If an open circuit is present at resistor 472, resistor 472 can be deemed to be of very high value (theoretically, infinitely high), though not conventionally shown in FIG. 4 as an open circuit.

With respect to calculating electrical conductivity (σ), sensors 250 can be calculated to measure voltage drop across sensors 250, as described above. Further, controller 123 can calculate R472. Further, controller 123 can calculate electrical conductivity (σ) by first calculating the electrical resistivity $p=R*(A/\epsilon)$, wherein p is electrical resistivity, R is electrical resistance (i.e., R472), and A is the cross-sectional area of each sensor 250, and $\epsilon$ is the distance between each sensor 250, as is known. The inverse of electrical resistivity is taken to find electrical conductivity (σ). Controller 123 can use this value to determine whether bale 110 is wrapped. To do so, controller 123 can, for example, compare σ with values in a look-up table and/or a predetermined threshold value. Further, controller 123 can be configured to ascertain that an open circuit is present between sensors 250, as described above with respect to using resistance (when calculating R472), such that σ would be very low or 0.

With respect to calculating electrical current, sensors 250 can be configured to measure current, in any conventional way. In this way, controller 123 can use this current value to determine whether bale 110 is wrapped. To do so, controller 123 can, for example, compare the current across sensors 250 with values in a look-up table and/or a predetermined threshold value. Further, controller 123 can be configured to ascertain that an open circuit is present between sensors 250 when the current value is zero ampere.

In operation, sensors 248, 249, 250 are normally electrically isolated from ground so that no current flows. When crop material 236 or other material is placed in front of sensors 248, 249, 250, a certain amount of electrical current flows, depending upon the conductivity (generally speaking) of the material therebetween. Using sensors 250 as a representative example, during baling, crop material 236 can be the material that bridges the gap between sensors 250. Once wrap material 247 is applied to the bale surface of crop material 247, the electrical conductivity (generally speaking) changes in at least two ways. First, wrap material 247 is less conductive than crop material 236. Thus, when wrap material 247 is present, less electrical current flows between sensors 250. Thus, the resistance of resistor 472 is higher than without wrap material 247; electrical conductivity (σ) is lower than without wrap material 247; and electrical current is lower than without wrap material. Any or all of these calculated values can be compared to respective threshold values by controller 123 to determine whether wrap material 247 is present around crop material 236. Further, alternatively or in addition thereto, any or all of these calculated values, i.e., resistance of resistor 472, can be compared before and after a wrap cycle. That is, resistance (and/or electrical conductivity (σ), and/or electrical current) can be measured before the wrap cycle and again after the wrap cycle. The comparison of these values can indicate presence or absence of wrap material 247. For instance, an increase in resistance suggests the presence of wrap material 247, whereas consistent values of resistance would suggest the absence of wrap material 247. These are the expectations when the electrical conductivity (generally speaking) of wrap material 247 is low, which can be considered to be the normal scenario and is the assumed scenario herein, unless otherwise noted. It is possible, however, to use a highly electrically conductive (generally speaking) wrap material 247, which would reverse the expectations; that is, the resistance of resistor 472 with the presence such wrap material 247 (after the wrap cycle) would decrease relative to a similar test before the wrap cycle (thus, the electrical conductivity (σ) and the electrical current would each increase). Second, wrap material 247 secures bale 110 into a more uniform cylindrical shape (than without wrap material 247 around crop material 236). This effectively pulls the surface of bale 110 (with wrap material 247 therearound) away from one or more electrodes 250, for example, and opens the electrical circuit, and electrical current is 0, which can be understood by controller 123, for example, as described above. In this situation, controller 123 can conclude that wrap material 247 is present about crop material 236. This determination by controller 123 can be made at any relevant point, such as before, during, and/or after the wrap cycle, though after the wrap cycle is the most critical time. Thus, controller 123 can obtain or otherwise calculate resistance, electrical conductivity (σ), and/or electrical current, for example, as described above, and if the resistance, electrical conductivity (σ), and/or electrical current does not change (increase or decrease, as the case may be: resistance, increase; electrical conductivity (σ), decrease; electrical current, decrease), then controller can indicate a faulty and/or nonexistent wrap of wrap material 247 about crop material 236. Further, with a plurality of sensor pairs (as in sensors 248, 249, 250), controller 123 can average together the values (respectively, electrical resistance, electrical conductivity (σ), and/or electrical current) to obtain a more accurate result, or a clearer picture of possibly a partial presence of wrap material 247 about crop material 236.

Figure 5:
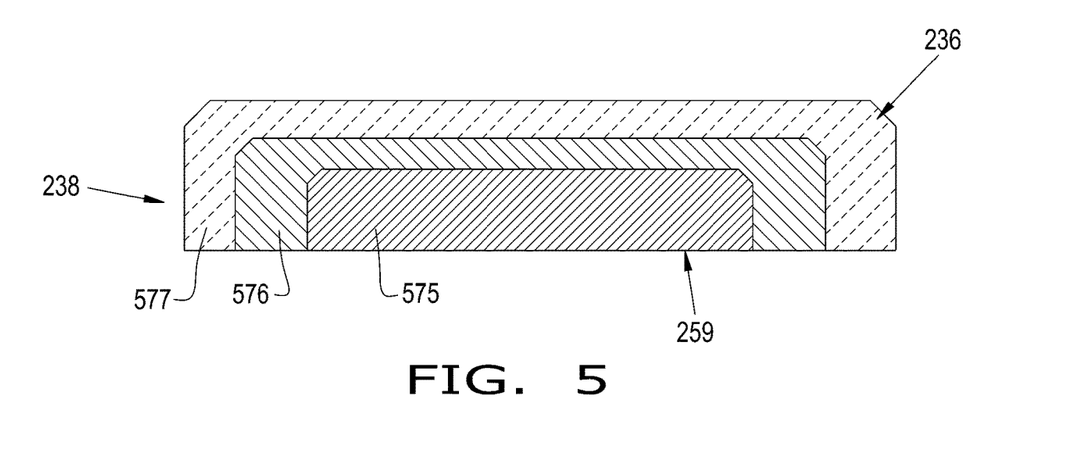
FIG. 5 illustrates a cross-section of a windrow of crop material to be picked up by the agricultural baler of FIG. 2, the cross-section being taken along line 5-5 in FIG. 2.

Referring now to FIG. 5, there is shown a cross-section of a windrow 238 of crop material 236 lying on the ground of field 237, taken along line 6-6 in FIG. 2 (field 237 not shown in FIG. 5 but being below windrow 238). FIG. 5 shows a moisture content profile of windrow 238 of crop material 236. That is, windrow 238 of crop material 236 exhibits variation of moisture content within its cross-section. More specifically, variation occurs from the interior of windrow 238 progressing to the exterior of windrow 238, with crop material 236 of higher moisture content being in the interior, and, conversely, crop material 236 with lower moisture content being at the exterior of windrow 238. Stated another way, the outside of windrow 238 is drier than the underside 259 of windrow 238. Such variation can be pronounced over time (after initial mowing), due to factors such as sun and wind causing the exterior of windrow 238 to dry more quickly than the interior. For illustrative purposes, FIG. 5 shows three layers showing this variation, interior layer (or core layer) 575, intermediate layer 576, and exterior layer 577. Unless sensors, such as sensors 250, detect the moisture content of interior layer 575, then a less accurate reading of the moisture content of a respective bale 110 will occur; that is, the moisture content will be underestimated. For instance, detecting the moisture content of only exterior layer 577 will be less accurate than detecting the moisture content of interior layer 575.

Referring again to FIG. 3, bale 110 is shown with a moisture content profile of bale 110 which corresponds to the moisture content profile shown in FIG. 5. More specifically, after windrow 238 of crop material 236 is picked up by crop collector 108 and moved into bale chamber 109, crop material 236 can maintain a substantially similar profile as to crop material 236 disposed in windrow 238 on field 237, as shown in FIG. 5. Bale 110 is shown in FIG. 3 with opposing transverse ends 355 (the right such end 355 is shown in FIG. 2), interior layer 575, intermediate layer 576, and exterior layer 577.

Sensors 248, 249, 250 can be used as described above to determine the moisture content of bale 110 forming in bale chamber 109. That is, sensors 248, 249, 250 can be used for dual purposes: (1) determining whether wrap material 247 is present on bale 110; and (2) determining the moisture content of bale 110 (at any stage, whether before or after wrapping bale 110 with wrap material 247, though before such wrapping is typically contemplated herein). For instance, sensors 248, 249, 250 can be used to detect moisture content of bale 110 during the baling process, that is, as bale 110 is forming in bale chamber, such as before wrap material 247 is wrapped therearound; and sensors 248, 249, 250 can also be used to detect wrap material 247 during or after the wrap cycle. Both types of sensing use the same principle of operation. For, moisture content of crop material 236 can be measured by electrical resistance, for example. Wetter crop material 236 is more conductive (less resistant) than drier crop material 236. Controller 123, like with the scenario concerning wrap material 247, can use a look-up table with values and/or a predetermined threshold value (such as for electrical resistance), such values corresponding to moisture content. Thus, like with the sensing of wrap material 247, the sensing of the moisture content of bale 110 employs the same operative parameter discussed above, one that is associated with an electrical property of the crop material, namely, electrical resistance, electrical conductivity (σ), and/or electrical current. Thus, controller 231 can be configured, for instance, to use the calculated or obtained values of electrical resistance, electrical conductivity (σ), and/or electrical current prior to the wrap cycle to ascertain moisture content of bale 110 and to use the calculated or obtained values of electrical resistance, electrical conductivity (σ), and/or electrical current during or after the wrap cycle to ascertain the presence of wrap material 247. Thus, the same operative parameter can be used for both purposes, but values can be taken at different times, that is, different stages in the baling process. In this way, a single sensor—namely, a single pair of sensors (i.e., 248, 249, and/or 250)—can be used to determine if wrap material 247 is on a surface of bale 110, and to determine the moisture content of the crop material 236 of bale 110. Further, moisture content can be used in conjunction with wrap material 247 detecting to enhance the accuracy of wrap material 247 detecting. That is, the moisture content found during stages of the bale forming process prior to using sensors 248, 249, 250 for wrap material 247 detection can be used to update look-up table values and/or threshold values concerning electrical resistance, electrical conductivity (σ), and/or electrical current, recognizing, for instance, that drier crop material 236 may have a higher electrical resistance, for instance, which should not be confused with wrap material 247 itself.

The present invention is more advantageous than prior art in terms of moisture detection. As indicated above, prior art uses sensors only on side walls 235 of baler 101, thereby detecting the moisture content of only of exterior layer 577 of bale 110. However, according to the present invention, at least one sensor (i.e., 250) is placed so as to detect the moisture content of interior layer 575, by positioning the sensor circumferentially about bale chamber 109 and thus on a circumferential surface of bale 110 (at least by the time that bale is fully formed), as shown in FIG. 2. That is, sensors 248, 249, 250 are each circumferentially positioned (that is, on a circumferential side of and facing bale 110) and can be positioned centrally relative to bale 110. Such a central location can also be thought of dimensionally, such that sensors are positioned within the transverse length of interior layer 575 and thus within approximately sixty percent of the distance extending from a longitudinally extending midline of baler 101 to a respective side wall 235. Stated another way, bale chamber 109 includes a transverse middle portion 358, and sensors 248, 249, 250 are positioned adjacent to this transverse middle portion 358. Access to transverse middle portion 358 by sensors can be as shown in the figures and can be obtained, generally speaking, between belts, between rollers, or between a feeding device (such as rotary mechanism 239) of baler 101. Thus, for instance, sensors 250 in FIG. 3 can be spaced substantially farther apart than what is shown in FIG. 3 (though closer than the nearest steel, or other electrically conductive member, to ensure electrical current passes between sensors 250). Further, the sensed or calculated values discussed above—electrical resistance, electrical conductivity (σ), electrical current (all of which relate, generally speaking, to conductivity)—can be averaged together for specific areas of bale 110, or for the entire bale 110, and correlated to a specific moisture content.

Thus, baler 101 includes at least one sensor 248, 249, 250 that is further configured for: sensing an additional operative parameter of crop material 236 in bale chamber 109 prior to the wrap cycle; and outputting an additional operative parameter signal corresponding to the additional operative parameter. This additional operative parameter is the electrical property referenced above (electrical resistance, electrical conductivity (σ), and/or electrical current), used for determining moisture content of bale 110. Thus, this additional operative parameter is not additional necessarily in the sense of a different kind of operative parameter but in the sense of being determined, typically, at an earlier period of time or stage in the bale forming process in bale chamber 109. Further, controller 231 is further configured for: receiving the additional operative parameter signal; and determining a moisture content of crop material 236 based at least in part on the additional operative parameter signal. Further, controller 231 can output the determined moisture content to a display of input/output device 120, for user, and/or store this information in a suitable place.

According to an alternative embodiment of the present invention, one or more sensors 353 can be positioned on or about a respective side wall 235, which is coupled with or forms part of frame 230 (sensors 353 are shown in broken lines in FIG. 3 to indicate an alternative embodiment of the present invention). Sensors 353 are substantially similar to sensors 248, 249, 250 and thus the description relating to those applies to sensors 353, except as noted. In the prior art, only side sensors are used. Here, side sensors 253 can be used in conjunction with one or more sensors 248, 249, 250. In this way, an electrical current 356 can pass between a sensor 353 and one sensor 250, for example (as with sensors 353, electrical current 356 is shown in broken lines in FIG. 3 because of its association with an alternative embodiment of the present invention). In this alternative, sensor 250 would not pair with a sensor 250 along bottom wall 234 (indeed, a second sensor 250 would not be present) but with a side sensor 353 alongside wall 235. By pairing a side sensor 353 with a circumferential, centrally located sensor 250 (that is, adjacent an interior layer 575), the measurements taken by sensors 250 and 353 can be more accurate than sensors disposed only on one or more side walls 235.

Further, in accordance with an alternative embodiment of the present invention, though control system 122 is described above as being configured for making a determination concerning the presence of wrap material 247 and for making a determination concerning moisture content of bale 110, these options can be considered in isolation. That is, control system 122 can be configured for making a determination concerning the presence of wrap material 247 without regard for any ability to make a determination concerning moisture content. Conversely, control system 122 can be configured for making a determination concerning moisture content without regard for any ability to make a determination concerning the presence of wrap material 247. In this latter vein, then, sensor 248, 249, 250 is further configured for outputting an operative parameter signal corresponding to the operative parameter (namely, an electrical property of crop material 236, such as electrical resistance, electrical conductivity (σ), and/or electrical current). Further, controller 231 is operatively coupled with at least one sensor 248, 249, 250 and configured for: receiving the operative parameter signal; and determining a moisture content of the crop material based at least in part on the operative parameter signal.

Figure 6:
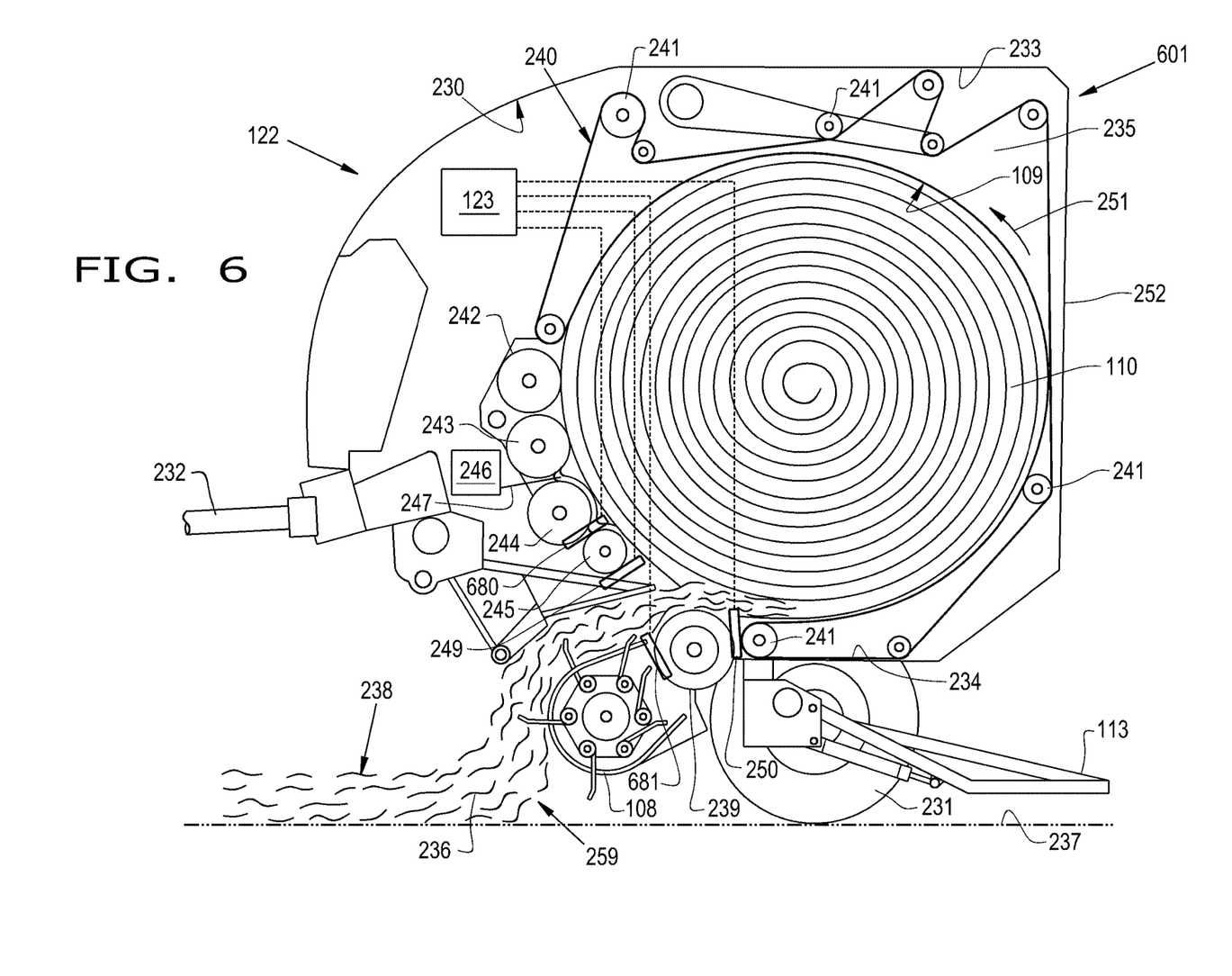
FIG. 6 illustrates a side cutaway view of the internal workings of an alternative embodiment of the agricultural baler, in accordance with an exemplary embodiment of the present invention.

Referring now to FIG. 6, there is shown an alternative embodiment of baler, namely, baler 601. Baler 601 is substantially similar to baler 101 in structure and function, and thus the description herein of baler 101 applies as well to baler 101, unless otherwise noted. The pertinent differences between balers 101 and 601 is the omission of sensor 248 and the inclusion of sensors 680, 681 relative to baler 601, in FIG. 6 (and thus any connectivity associated with sensors 248, 680, 681). All other elements shown in FIG. 6 thus have the same reference characters as in FIG. 2 and thus will not be described again here, it being understood that like reference characters are substantially similar in structure and function. Sensors 249, 250, 680, 681 are shown in FIG. 6, and sensors 680, 681 are substantially similar in structure and function as sensors 248, 249, 250, though sensor 681 cannot perform the function of wrap material 247 detection, because of its positioning. Thus, sensors 249, 250, 680 can perform both functions (wrap material 247 detection, and moisture content detection) and sensor 681 can perform moisture content detection. Regarding positioning, sensor 680 is positioned between rollers 244, 245, and sensor 681 is positioned to an upstream side of rotary mechanism 239 (whereas sensor 250 is positioned to a downstream side of rotary mechanism 239). Further, sensor 680 is circumferentially positioned relative to bale 110, though sensor 681 is not circumferentially positioned with respect to bale 110. Each of sensors 249, 250, 680, 681 can be in contact with crop material 236 as it is forming into bale 110 during substantially the entire time that crop material 236 is held by baler 601, particularly, prior to the wrap cycle. Each sensor 249, 250, 680, 681 is positioned to the underside 259 of crop material, and can be positioned to sense within the transverse middle portion 358 of bale 110.

In use, when crop material 236 is disposed in a swath or windrow 238, baler 101, 601 can be pulled by work vehicle 100 and thereby pick up the crop material 236 from field 237. In so doing, crop material 236 is fed into bale chamber 109. Before reaching bale chamber, sensor 681 can sense the operative parameter of crop material, namely, an electrical property such as electrical resistance, electrical conductivity (σ), and/or electrical current, and provide this data to controller 231 to provide an initial value of the moisture content of crop material 236. Further, as crop material 236 forms into bale 110, sensors 248, 249, 250, 680, 681 can detect the electrical property to continue providing data as to moisture content, controller optionally averaging the total values obtained to obtain single moisture content per bale 110. Further, sensors 248, 249, 250, 680, at some point during wrap cycle and/or at the end of the wrap cycle before bale 110 is ejected from bale chamber 109, can sense the electrical property (electrical resistance, electrical conductivity (σ), and/or electrical current) and provide this data to controller 231, which can make a determination as to whether wrap material 247 is present on bale 110 or not. If so, then baler 101, 601 can proceed to eject bale 110 from baler 101, 601; if not, then baler 101, 601 can be prevented from ejecting bale 110, unless and until bale 110 is properly wrapped.

Figure 7:
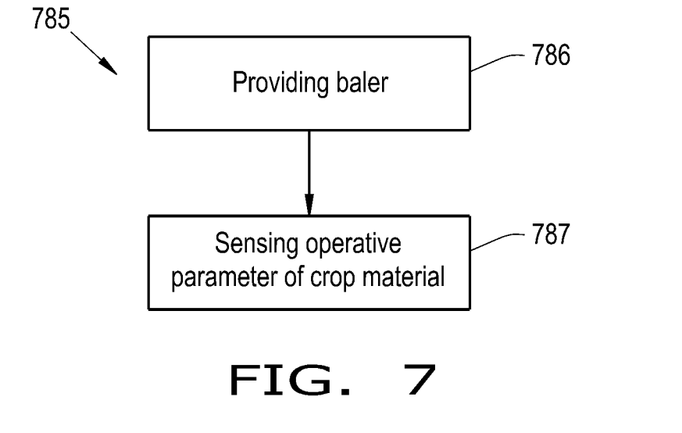
FIG. 7 illustrates a flow diagram showing a method of using an agricultural baler, in accordance with an exemplary embodiment of the present invention.

Referring now to FIG. 7, there is shown a flow diagram showing method 785 of using an agricultural baler 101, 601, the method 785 including the steps of: providing 786 an agricultural baler 101, 601 that includes a frame 230, a bale chamber 109 coupled with the frame 230, and a control system 114, 122 including at least one sensor 248, 249, 250, 680 coupled with the frame and positioned circumferentially relative to the bale chamber; and sensing 787, by the at least one sensor 248, 249, 250, 680, an operative parameter of a crop material 236 in the bale chamber 109. The operative parameter can be associated with an electrical property of the crop material 236. The method 785 can further include the steps of: providing that the agricultural baler 101, 601 further includes a wrapping assembly 246 coupled with the frame 230 and configured for wrapping a wrap material 247 about the crop material 236 in the bale chamber 109 during a wrap cycle, and that the control system 114, 122 further includes a controller 115, 123 operatively coupled with the at least one sensor 248, 249, 250, 680; outputting, by the at least one sensor 248, 249, 250, 680, an operative parameter signal corresponding to the operative parameter; receiving, by the controller 115, 123, the operative parameter signal; and determining, by the controller 115, 123, a wrap material condition relative to the crop material 236 based at least in part on the operative parameter signal. The method 785 can further include the steps of: sensing, by the at least one sensor 248, 249, 250, 680, an additional operative parameter of the crop material 236 in the bale chamber 109 prior to the wrap cycle; outputting, by the at least one sensor 248, 249, 250, 680, an additional operative parameter signal corresponding to the additional operative parameter; receiving, by the controller 115, 123, the additional operative parameter signal; determining, by the controller 115, 123, a moisture content of the crop material 236 based at least in part on the additional operative parameter signal. The method 785 can further include the steps of: providing that the control system 114, 122 further includes a controller 115, 123 operatively coupled with the at least one sensor 248, 249, 250, 680; outputting, by the at least one sensor 248, 249, 250, 680, an operative parameter signal corresponding to the operative parameter; receiving, by the controller 115, 123, the operative parameter signal; and determining, by the controller 115, 123, a moisture content of the crop material 236 based at least in part on the operative parameter signal. Further, bale chamber 109 can include a transverse middle portion 358, the at least one sensor 248, 249, 250, 680 being positioned adjacent to the transverse middle portion 358, and is thus configured for being positioned adjacent to a transverse middle portion of a respective bale 110.

It is to be understood that the steps of method 785 are performed by controller 115, 123 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123 described herein, such as the method 785, is implemented in software code or instructions which are tangibly stored on a tangible computer readable medium. The controller 115, 123 loads the software code or instructions via a direct interface with the computer readable medium or via a wired and/or wireless network. Upon loading and executing such software code or instructions by controller 115, 123, controller 115, 123 may perform any of the functionality of controller 115, 123 described herein, including any steps of the method 785.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:
1. A control system of an agricultural baler, the agricultural baler including a frame, a bale chamber coupled with the frame, and a wrapping assembly coupled with the frame and configured for wrapping a wrap material about the crop material in the bale chamber during a wrap cycle, the control system comprising:
at least one sensor coupled with the frame, positioned circumferentially relative to the bale chamber, and configured for sensing an operative parameter of a crop material in the bale chamber, wherein the operative parameter is associated with an electrical property of the crop material, and the at least one sensor is configured to output an operative parameter signal corresponding to the operative parameter; and
a controller operatively coupled with the at least one sensor and configured to:
receive the operative parameter signal; and
determine whether the wrap material is wrapped about the crop material based at least in part on the operative parameter signal.
2. The control system of claim 1, wherein:
the at least one sensor is further configured for:

sensing an additional operative parameter of the crop material in the bale chamber prior to the wrap cycle; and outputting an additional operative parameter signal corresponding to the additional operative parameter; and the controller is further configured for:

receiving the additional operative parameter signal; and determining a moisture content of the crop material based at least in part on the additional operative parameter signal.

3. The control system of claim 1, wherein the at least one sensor is configured for being positioned adjacent to a transverse middle portion of the bale chamber.

4. An agricultural baler, comprising:
a frame;
a bale chamber coupled with the frame;
a wrapping assembly coupled with the frame and configured to wrap a wrap material about a crop material in the bale chamber during a wrap cycle; and
a control system including:
at least one sensor coupled with the frame, positioned circumferentially relative to the bale chamber, and configured for sensing an operative parameter of the crop material in the bale chamber, wherein the operative parameter is associated with an electrical property of the crop material, and the at least one sensor is configured to output an operative parameter signal corresponding to the operative parameter; and
a controller operatively coupled with the at least one sensor and configured to:
receive the operative parameter signal; and
determine whether the wrap material is wrapped about the crop material based at least in part on the operative parameter signal.

5. The agricultural baler of claim 4, wherein:
the at least one sensor is further configured for:
sensing an additional operative parameter of the crop material in the bale chamber prior to the wrap cycle; and
outputting an additional operative parameter signal corresponding to the additional operative parameter; and
the controller is further configured for:
receiving the additional operative parameter signal; and
determining a moisture content of the crop material based at least in part on the additional operative parameter signal.

6. The agricultural baler of claim 4, wherein the bale chamber includes a transverse middle portion, the at least one sensor being positioned adjacent to the transverse middle portion.

7. A method of using an agricultural baler, the method comprising the steps of:
providing an agricultural baler that includes a frame, a bale chamber coupled with the frame, a wrapping assembly coupled with the frame and configured to wrap a wrap material about a crop material in the bale chamber during a wrap cycle, and a control system including at least one sensor coupled with the frame and positioned circumferentially relative to the bale chamber and a controller operatively coupled with the at least one sensor;
sensing, by the at least one sensor, an operative parameter of the crop material in the bale chamber, wherein the operative parameter is associated with an electrical property of the crop material;
outputting, by the at least one sensor, an operative parameter signal corresponding to the operative parameter;
receiving, by the controller, the operative parameter signal; and
determining, by the controller, whether the wrap material is wrapped about the crop material based at least in part on the operative parameter signal.

8. The method of claim 7, further including the steps of:
sensing, by the at least one sensor, an additional operative parameter of the crop material in the bale chamber prior to the wrap cycle;
outputting, by the at least one sensor, an additional operative parameter signal corresponding to the additional operative parameter;
receiving, by the controller, the additional operative parameter signal; and
determining, by the controller, a moisture content of the crop material based at least in part on the additional operative parameter signal.

9. The method of claim 7, wherein the bale chamber includes a transverse middle portion, the at least one sensor being positioned adjacent to the transverse middle portion.

* * * * *